(12) United States Patent
Iwata et al.

(10) Patent No.: US 6,275,032 B1
(45) Date of Patent: Aug. 14, 2001

(54) SURFACE FLATNESS MEASURING APPARATUS

(75) Inventors: Tetsuya Iwata; Makoto Hirokawa, both of Nagaoka (JP)

(73) Assignee: System Seiko Co., Ltd., Niigata (JP)

( * ) Notice: Subject to any disclaimer, the term of this patent is extended or adjusted under 35 U.S.C. 154(b) by 0 days.

(21) Appl. No.: 09/217,114

(22) Filed: Dec. 21, 1998

(30) Foreign Application Priority Data

Dec. 25, 1997 (JP) .................................................. 9-356771

(51) Int. Cl.[7] .............................. G01B 7/34; G01B 7/287; G01B 21/30; G01N 27/72
(52) U.S. Cl. ........................ 324/243; 324/210; 324/232; 324/262; 33/533
(58) Field of Search .................................... 324/210, 212, 324/226, 227, 232, 234–243, 261, 262; 73/105; 33/533

(56) References Cited

U.S. PATENT DOCUMENTS

| | | | |
|---|---|---|---|
| 3,371,272 | * | 2/1968 | Stanton ............................. 324/243 X |
| 3,502,968 | * | 3/1970 | Tobin, Jr. et al. ................... 324/243 |
| 3,611,120 | * | 10/1971 | Forster ............................. 324/243 X |
| 4,288,747 | * | 9/1981 | Kawabata et al. ................ 324/243 X |
| 4,622,517 | * | 11/1986 | Arnaud et al. .................... 324/243 X |
| 4,739,261 | * | 4/1988 | Sugiyama et al. ................... 324/232 |
| 4,755,753 | * | 7/1988 | Chern ............................... 324/243 X |
| 4,766,374 | * | 8/1988 | Glass, III et al. ................ 324/243 X |
| 5,028,100 | * | 7/1991 | Valleau et al. ..................... 324/232 |
| 5,721,488 | * | 2/1998 | Sakai et al. ......................... 324/210 |

FOREIGN PATENT DOCUMENTS

| | | | |
|---|---|---|---|
| 61-205817 | * | 9/1986 | (JP) ..................................... 324/262 |
| 63-204110 | * | 8/1988 | (JP) ..................................... 324/262 |
| 3-137506 | | 6/1991 | (JP) ............................... G01B/21/30 |
| 7-71954 | | 3/1995 | (JP) ............................... G01B/21/30 |

* cited by examiner

Primary Examiner—Gerard R. Strecker
(74) Attorney, Agent, or Firm—McCormick, Paulding & Huber LLP

(57) ABSTRACT

A flatness measuring apparatus is adapted to measure the flatness of the surface of a plate-shaped object such as a disk in a non-contact fashion. A disk is removably held by a measuring table, with the projection of the measuring table engagedly received in a central through hole of the disk. A plurality of eddy current undulation sensors are arranged in a sensor head that is arranged so as to be able to linearly move back and forth along the measuring table. Said eddy current undulation sensors generate an eddy current in said disk and detect any undulation on the surface of said disk. A flatness map is produced for the surface of the disk based on a signal representing the position of the sensor head and on signals from the eddy current undulation sensors, and then is output to a display and/or a printer.

4 Claims, 4 Drawing Sheets

SURFACE FLATNESS MEASURING APPARATUS

BACKGROUND OF THE INVENTION

1. Field of the Invention

This invention relates to a flatness measuring apparatus for measuring flatness of a surface of a plate-shaped object such as a magnetic disk to be used as storage medium for computers.

2. Related Art Statement

For example, magnetic disks to be used as storage medium for computers typically comprise a substrate made of aluminum alloy or glass and a magnetic film formed on the surface of the substrate.

For manufacturing high quality magnetic disks, the disks are required to show a certain level of surface flatness, so their substrates are normally checked for flatness of the surface in an after-fabrication process.

Electric micrometers are known as means for checking whether the object of examination such as a plate-shaped product shows a predetermined level of surface flatness. The electric micrometer is in fact a displacement sensor comprising a probe and a transducer for transducing any mechanical displacement of the probe into an electric signal such that, as the probe is driven to slidingly move on the surface of a plate-shaped object, any displacement of the probe on the surface is transferred to the core of the actuator transformer of the sensor and detected as electric signal representing the surface condition of the object.

However, with a method of measuring the surface flatness of an object by holding a contact probe in contact with the surface of the object, the contact probe may damage and leave one or more than one flaws on the surface. Such a flaw should be avoided by any means particularly when it comes to a magnetic disk that requires a mirror finish to say nothing of a highly smoothed surface. Additionally, for the purpose of measuring efficiency, the operation of observing the surfaces of products supplied on a mass production basis is preferably automated.

SUMMARY OF THE INVENTION

Thus, it is an object of the present invention to provide a flatness measuring apparatus adapted to measure the flatness of the surface of a plate-shaped object such as a disk in a non-contact fashion.

Another object of the present invention is to provide a flatness measuring apparatus adapted to automatically measure flatness of a surface of a plate-shaped object such as a disk.

According to the invention, the above objects and other objects are achieved by providing a flatness measuring apparatus for measuring the flatness of the surface of an object comprising a measuring table for removably holding thereon an object of measurement, a sensor head arranged along said measuring table with a predetermined gap between itself and the surface of said object of measurement held on said measuring table so as to be movable relative to said object of measurement, a plurality of eddy current undulation sensors arranged in said sensor head to generate an eddy current in said object of measurement and detect any undulation on the surface of said object of measurement, and a control section for drawing a flatness map for the surface of said object of measurement based on a signal representing the relative positions of said sensor head and said object of measurement and on signals from said respective eddy current undulation sensors so as to output a map data to an output section.

According to another aspect of the invention, there is provided a flatness measuring apparatus for measuring flatness of a surface of a disk comprising a measuring table for removably holding thereon a disk, said measuring table having a projection for being engagedly received in a central through hole of said disk, a sensor head arranged along said measuring table with a predetermine gap between itself and the surface of said disk held on said measuring table so as to be able to linearly reciprocate relative to said disk, a plurality of eddy current undulation sensors arranged in said sensor head to generate an eddy current in said disk and detect any undulation on the surface of said disk, and a control section for drawing a flatness map for the surface of said disk based on a signal from a position detector for detecting the position of said sensor head and on signals from the respective eddy current undulation sensors so as to output a map data to an output section. Preferably, a flatness measuring apparatus according to the invention further comprises an inverting means adapted to be able to horizontally reciprocate to a position right above said measuring table and invert said disk while holding said disk so as to automatically measure flatness of each of opposite sides of said disk.

Preferably said measuring table is adapted to be able to vertically reciprocate. Still preferably, said disk is a magnetic disk substrate.

Thus, according to the invention, since the flatness of the surface of an object of measurement is measured by means of eddy current undulation sensors of a non-contact type that are not brought into contact with the surface of the object of measurement for measuring the surface flatness, the object of measurement is protected against any damage and deformation during the measurement and the surface flatness can be precisely determined.

The above objects and other objects of the present invention as well as the novel features of the invention will become apparent by reading the following detailed description made by referring to the accompanying drawings.

DETAILED DESCRIPTION OF THE PREFERRED EMBODIMENT

Now, the present invention will be described by referring to the accompanying drawings that illustrate a preferred embodiment of the invention.

Figure 1:
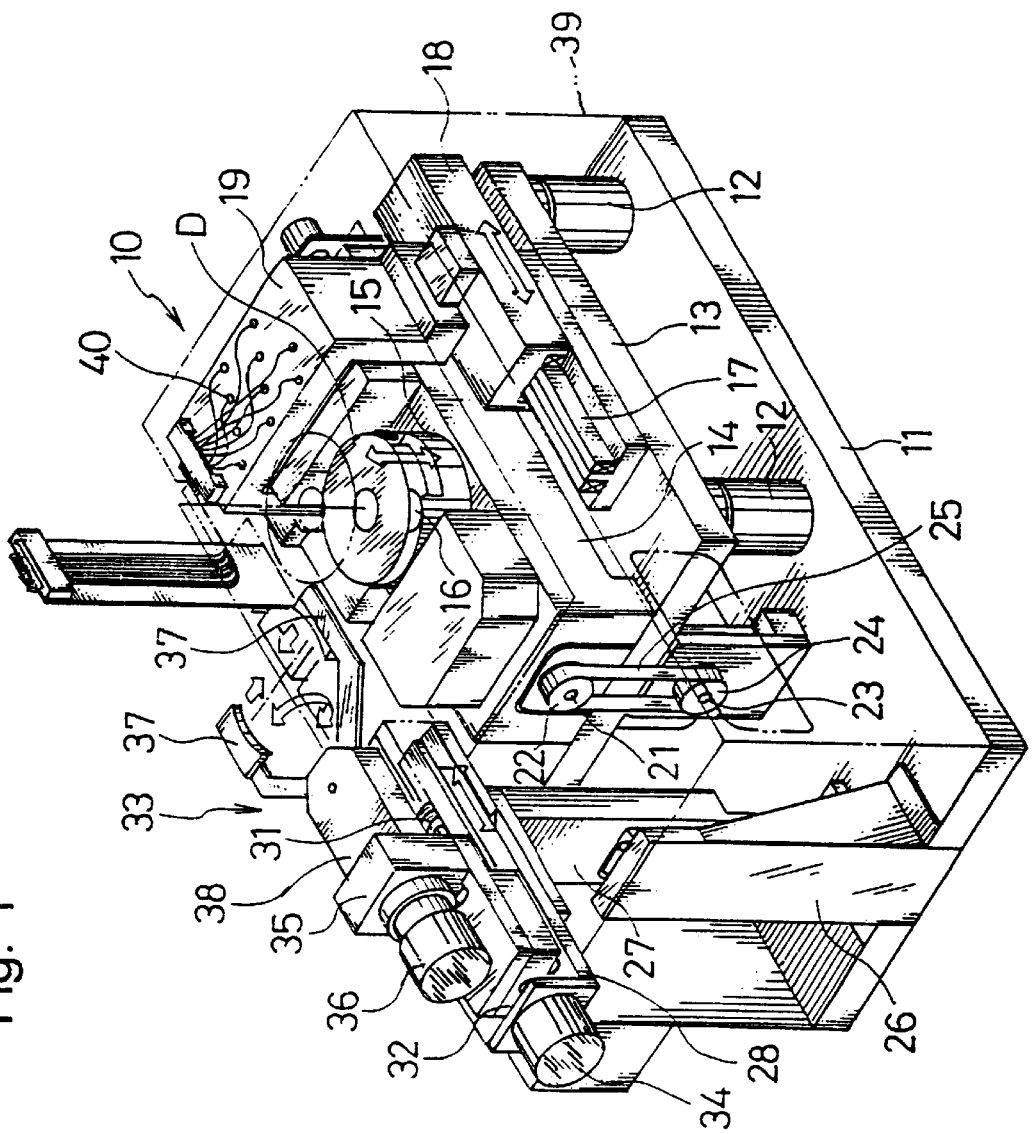
FIG. 1 is a partly cut out schematic perspective view of an embodiment of flatness measuring apparatus according to the invention.

FIG. 1 is a schematic perspective view of an embodiment of flatness measuring apparatus according to the invention and adapted to measure the flatness of the surface of an object of measurement, which is a disk substrate to be used for manufacturing a magnetic disk. The flatness measuring apparatus comprises a main body 10 having a bottom plate 11 and a support plate 13 rigidly supported on the bottom plate 11 by way of posts 12. A base block 14 is rigidly fitted onto the support plate 13.

The base block 14 carries thereon a measuring table 15 for holding an object of measurement, or disk D, which measuring table 15 is adapted to be able to vertically move relative to the base block 14 as the measuring table 15 is driven by a vertical drive means (not shown) such as a motor incorporated into the base block 14. The object of measurement, or disk D, has a central through hole and a circular outer periphery. The measuring table 15 has a circular contour corresponding to the outer periphery of the disk D and a central cylindrical projection 16 to be engagedly received in the through hole of the disk D. Thus, the disk D is removably placed on the measuring table 15 and secured in position as the projection 16 of the measuring table 15 is engagedly received in the central through hole of the disk D.

A pair of guide rails 17 are secured to the support plate 13 along the opposite lateral edges of the base block 14. A pair of sliding blocks 18 are fitted to and adapted to be able to linearly reciprocate on the respective guide rails 17. A sensor head 19 is secured to the sliding blocks 18 so as to bridge the sliding blocks 18 across the base block 14.

A ball screw 21 is rotatably fitted to the support plate 13 in order to drive the sensor head 19 to linearly reciprocate along the base block 14 and a nut (not shown) held in thread engagement with the ball screw 21 is linked to the sensor head 19 by way of the sliding blocks 18. A timing pulley 22 is fitted to an end of the ball screw 21. Another timing pulley 24 is fitted to the shaft 23 of a motor (not shown) arranged below the support plate 13. The timing pulleys 22 and 24 are linked to each other by way of a timing belt 25. Thus, as the ball screw 21 is driven to rotate by the motor, the sensor head 19 moves back and forth along the base block 14.

A guide post 26 is fitted to an edge of the main body 10 and provided with a sliding strut 27 adapted to move vertically along the guide post 26. A work carriage 28 is arranged on top of the sliding strut 27. A ball screw 31 is rotatably fitted to the work carriage 28 and a work holding chuck 33 is fitted to a nut 32 that is held in thread engagement to the ball screw 31. The work carriage 28 is provided with a motor 34 for driving the ball screw 31 so that the work holding chuck 33 moves back and forth in parallel with the sensor head 19 as the ball screw 31 is driven by the motor 34.

The work holding chuck 33 is fitted to the nut 32 by way of a support member 35 secured to the nut 32 such that the work holding chuck 33 is rotatable around a horizontal axis of rotation relative to the support member 35. A motor 36 is fitted to the support member 35 in order to drive the work holding chuck 33 to rotate. The work holding chuck 33 has fingers 37 that can be opened and closed by an actuator 38. The bottom plate 11 is provided with a cover 39 for covering most of the main body 10 indicated by dotted broken lines in FIG. 1. An aperture in the cover 39 leaves the base block 14 and measuring table 15 uncovered and the sensor head 19 projects upward from the cover 39 through that aperture. The strut 27 projects upwardly through another aperture in the cover and supports the carriage 28 and chuck 33 above the cover.

When inspecting the surface of a disk D by means of the embodiment of flatness measuring apparatus shown in FIG. 1, the work holding chuck 33 is driven to its retreat position by means of the motor 34 with the fingers 37 held in an open state by the actuator 38 and then the disk D is moved to a position between the fingers 37 by means of a transferring device (not shown). Then, the fingers 37 are closed by operating the actuator 38 under this condition to hold the disk D therebetween and the transferring device is retracted. Subsequently, the disk D is moved by the chuck 33 to a position right above the measuring table 15 by operating the motor 34. The disk D at this position is shown by a dotted broken circle in FIG. 1.

Then, under this condition, the measuring table 15 is raised until its projection 16 is engagedly received in the central through hole of the disk D, when the fingers 37 are opened to place the disk D in position on the measuring table 15. Note that the measuring table 15 is provided with a plurality of notches 15a (FIG. 2) so that the measuring table 15 may not interfere with the motion of the fingers 37. The measuring table 15 loaded with the disk D is then lowered to make it ready for measuring the disk D.

After the disk D is examined for flatness of one of the opposite surfaces, the measuring table 15 is raised again and the disk D is grasped and turned upside down by the fingers 37 of the work holding chuck 33. Then, the disk D is placed in position once again on the measuring table 15 so that the disk D is examined for flatness of the other of the opposite surfaces.

Figure 2:
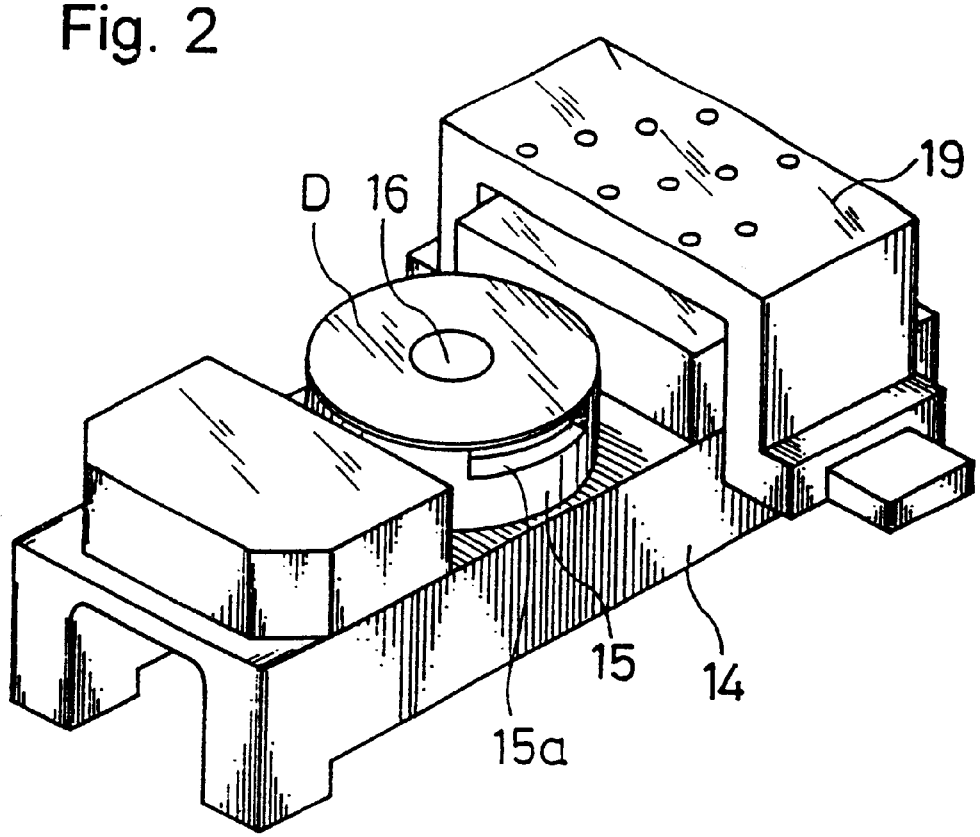
FIG. 2 is a schematic perspective view of the embodiment of FIG. 1, showing only a principal part thereof.
Figure 3:
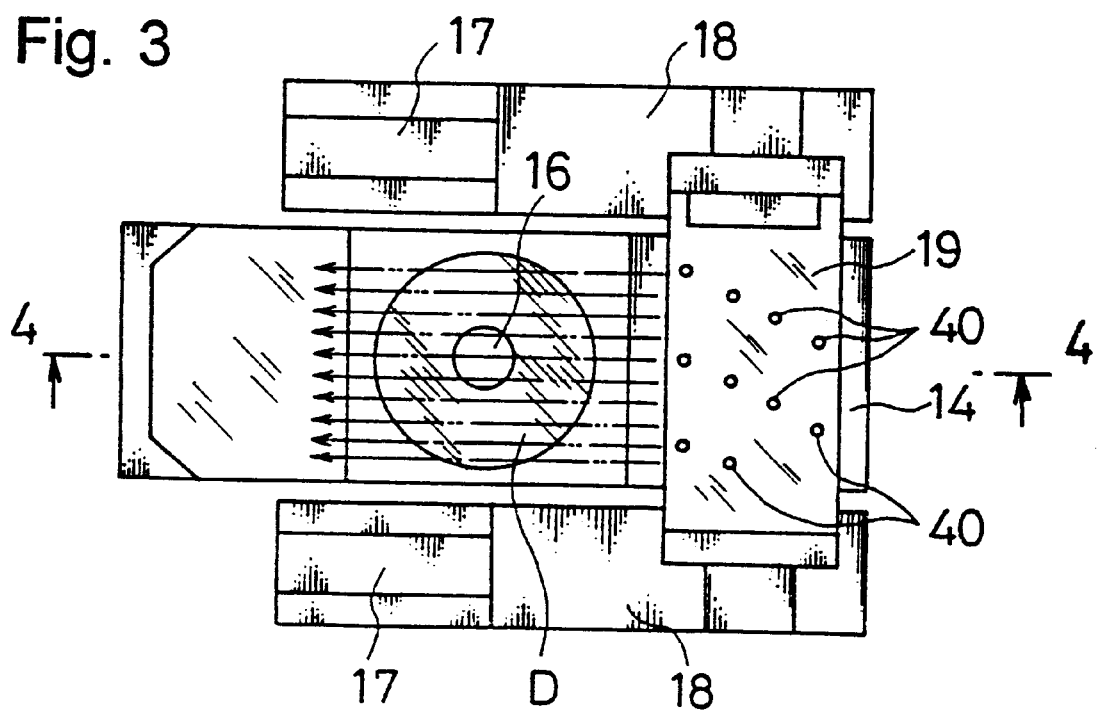
FIG. 3 is a schematic plan view of FIG. 2.
Figure 4:
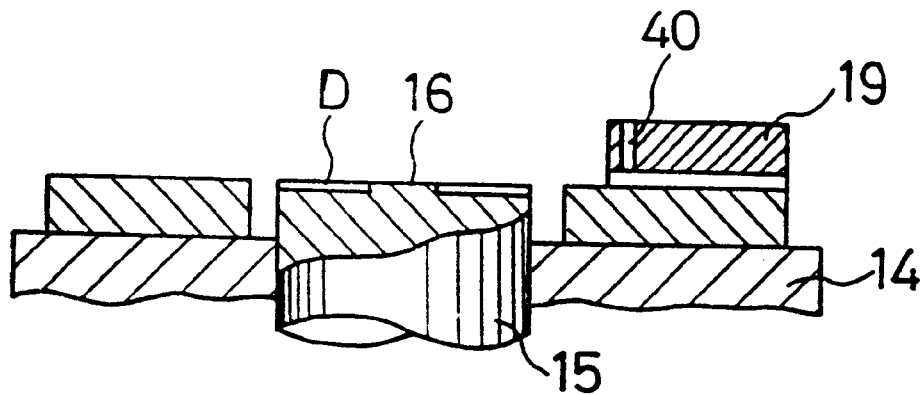
FIG. 4 is a schematic cross sectional view taken along line 4—4 in FIG. 3.
Figure 5:
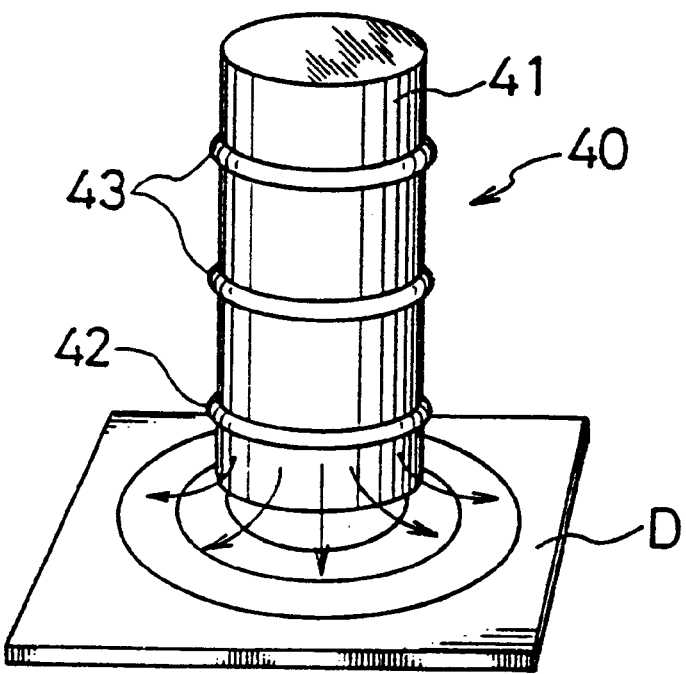
FIG. 5 is a schematic perspective view of the eddy current undulation sensors.

Referring now to FIG. 2, the sensor head 19 has a gate-like profile and carries a total of ten eddy current undulation sensors 40 as seen from FIGS. 2, 3 and 4 provided on a horizontal section thereof that eventually comes to face the object of measurement, or disk D. Referring to FIG. 5, each of the eddy current undulation sensors 40 comprises an excitation coil 42 and a detection coil 43 wound around a sensor main body 41 which is made of an electric insulator. As the excitation coil 42 is fed with an AC voltage, an eddy current is generated in the object of measurement, or disk D by the AC magnetic field produced by the coil 42. The magnetic field that is generated by the eddy current is directed reversely relative to the magnetic field that is generated by the coil 42. As a result, the output of the detection coil 43 is affected by the combined effect of the two magnetic fields such that the intensity and the phase of the electric current flowing through the detection coil 43 will be changed by the two magnetic fields. The change is a function of the distance between the object of measurement and the eddy current undulation sensor 40. More specifically, a large change occurs when the distance between the object of measurement and the eddy current undulation sensor 40 is small, whereas only a small change occurs when the distance is large so that any undulation on the surface of the object of measurement is detected as a change in the distance between the eddy current undulation sensor 40 and the object of measurement.

As the sensor head 19 is moved along the base block 14 from right to left in FIGS. 3 and 4, the eddy current undulation sensors 40 follow respective tracks indicated by dotted broken arrows in FIG. 3 to scan the surface of the disk D and measure the flatness of the surface by way of the distance between each of the eddy current undulation sensors 40 and the surface of the disk D.

Thus, the surface flatness of the disk D is determined by the eddy current undulation sensors 40 by seeing whether the distance between the front end of each of the eddy current undulation sensors and the surface of the object of measurement, or disk D, is found within a predetermined range or not.

Figure 6:
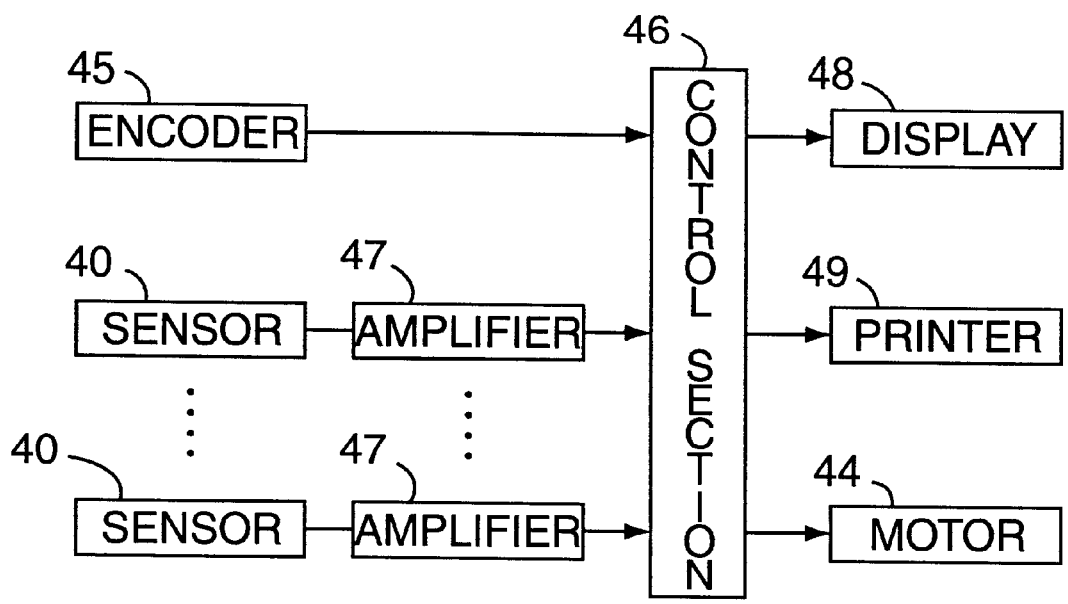
FIG. 6 is a schematic block diagram of the control circuit for displaying the detected flatness.

FIG. 6 is a schematic block diagram of the control circuit for displaying the detected flatness, and an encoder 45 detects the position of the sensor head 19 by counting the number of revolutions of the motor 44 that is driving the ball screw 31 to rotate and transmits its output signal to the control section 46 typically comprising a central processing unit CPU, while the signals from the ten eddy current undulation sensors 40 are also sent to the control section 46 by way of respective amplifiers 47. Then, the control section 46 outputs a flatness map to a display 48 such as a CRT and/or a printer 49, the flatness map showing the flatness values and the distribution of the values obtained on the basis of the signals transmitted to it from the eddy current undulation sensors 40.

Figure 7:
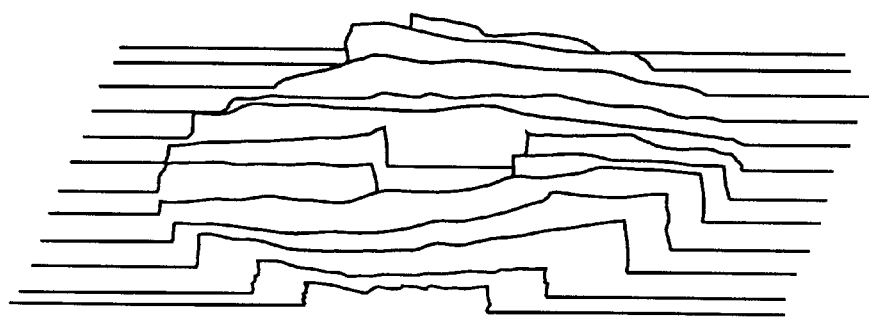
FIG. 7 is a schematic flatness map that can be obtained by the flatness measuring apparatus according to the invention.

FIG. 7 is a schematic flatness map that can be obtained by being printed out and expressed in the order of microns. Note that, in FIG. 7, a flatness map obtained by using a sensor head 19 carrying thereon a total of twelve eddy current undulation sensors 40, is shown. In this map data, the output of the sensor is shown based on an averaged values obtained at five points selected with regular intervals of 1/150 mm.

It may be so arranged that the obtained flatness data are stored in a memory and compared with a set of reference values so that the disk D may be accepted or rejected automatically.

The sensor head 19 of the illustrated embodiment of flatness measuring apparatus is arranged to move and scan the object of measurement, or disk D, and not vice versa so that any possible measurement errors that can occur due to a rocking motion of the disk D when the disk D is moved, can be effectively prevented from taking place. Additionally, the swingable work holding chuck 33 of the embodiment can automatically turn the disk D upside down to inspect the surface flatness for the both sides also automatically.

While the present invention is described above in detail by way of a preferred embodiment, it may be needless to say that it can be modified and altered in various different ways without departing from the scope of the invention.

For instance, while the sensor head 19 of the illustrated embodiment carries a total of ten eddy current undulation sensors 40, the number of eddy current undulation sensors is variable. Similarly, while the measuring table 15 of the embodiment is stationary, the measuring table 15 may alternatively be made movable while the sensor head 19 is made stationary to keep the measuring table 15 and the sensor head 19 adapted to move linearly relative to each other. Additionally, while a disk D is moved in and placed in position automatically in the above described embodiment, it may alternatively be so arranged that a disk D is placed in position manually but turned upside down automatically. While the object of measurement of the illustrated embodiment is an aluminum disk substrate in the above description, the embodiment can be used to measure the flatness of any flat object so long as it is an electric conductor.

Since the surface flatness of an object of measurement is observed by means of a plurality of eddy current undulation sensors in a non-contact fashion in the above embodiment, the object of measurement is free from any damage and deformation that can take place on the surface of an object of measurement when a contact type flatness measuring apparatus is used and the surface flatness can be determined highly accurately.

Additionally, the surface flatness of the object of measurement can be determined automatically for the both sides as the object of measurement is turned upside down automatically.

Finally, since data can be obtained automatically for the surface flatness of an object of measurement and the obtained flatness data can be compared with a set of reference data in the above embodiment, the object of measurement can be accepted or rejected automatically.

What is claimed is:

1. A flatness measuring apparatus for measuring flatness of a surface of an electrically conductive disk comprising:

a measuring table for removably holding thereon a disk, said measuring table having a projection for being engagedly received in a central through hole of said disk;

a sensor head arranged along said measuring table with a predetermined gap between itself and the surface of said disk held on said measuring table so as to be able to linearly reciprocate relative to said disk along lines parallel to the surface of said disk;

a plurality of eddy current undulation sensors arranged in said sensor head to detect undulations on a surface of said disk as the sensor head is linearly reciprocated relative to said disk;

a control section for drawing a flatness map for the surface of said disk based on signals from a position detector for detecting the position of said sensor head and on output signals from the eddy current undulation sensors;

each of said eddy current undulation sensors having an excitation coil excitable by an AC current to create a magnetic field passing through and creating eddy currents in said disk, and also having a detection coil arranged so that the magnetic field also passes through the detection coil and generates in the detection coil said output signals; and an inverting means adapted to be able to horizontally reciprocate to a position right above said measuring table and invert said disk by holding said disk so as to automatically measure flatness of each of opposite sides of said disk.

2. A flatness measuring apparatus according to claim 1, wherein said measuring table is adapted to be able to vertically reciprocate.

3. A flatness measuring apparatus according to claim 1, wherein said disk is a magnetic disk substrate.

4. A flatness measuring apparatus according to claim 1, wherein each of said eddy current undulation sensors includes a core of electrically non-conductive material, which core carries both said excitation coil and said detector coil.

* * * * *